March 16, 1937. F. E. PFEIFFER Re. 20,296

BILLING MACHINE

Original Filed June 12, 1931 5 Sheets-Sheet 1

Inventor
FRANK E. PFEIFFER,
By
Attorneys

March 16, 1937. F. E. PFEIFFER Re. 20,296

BILLING MACHINE

Original Filed June 12, 1931 5 Sheets-Sheet 2

Inventor
FRANK E. PFEIFFER,
By Toulmin & Toulmin
Attorneys

March 16, 1937. F. E. PFEIFFER Re. 20,296

BILLING MACHINE

Original Filed June 12, 1931 5 Sheets-Sheet 3

Inventor
FRANK E. PFEIFFER,
Pauline & Pauline
Attorneys

March 16, 1937. F. E. PFEIFFER Re. 20,296

BILLING MACHINE

Original Filed June 12, 1931 5 Sheets-Sheet 4

Inventor
FRANK E. PFEIFFER,
Paulmier & Paulmier
Attorneys

March 16, 1937. F. E. PFEIFFER Re. 20,296
BILLING MACHINE
Original Filed June 12, 1931 5 Sheets-Sheet 5
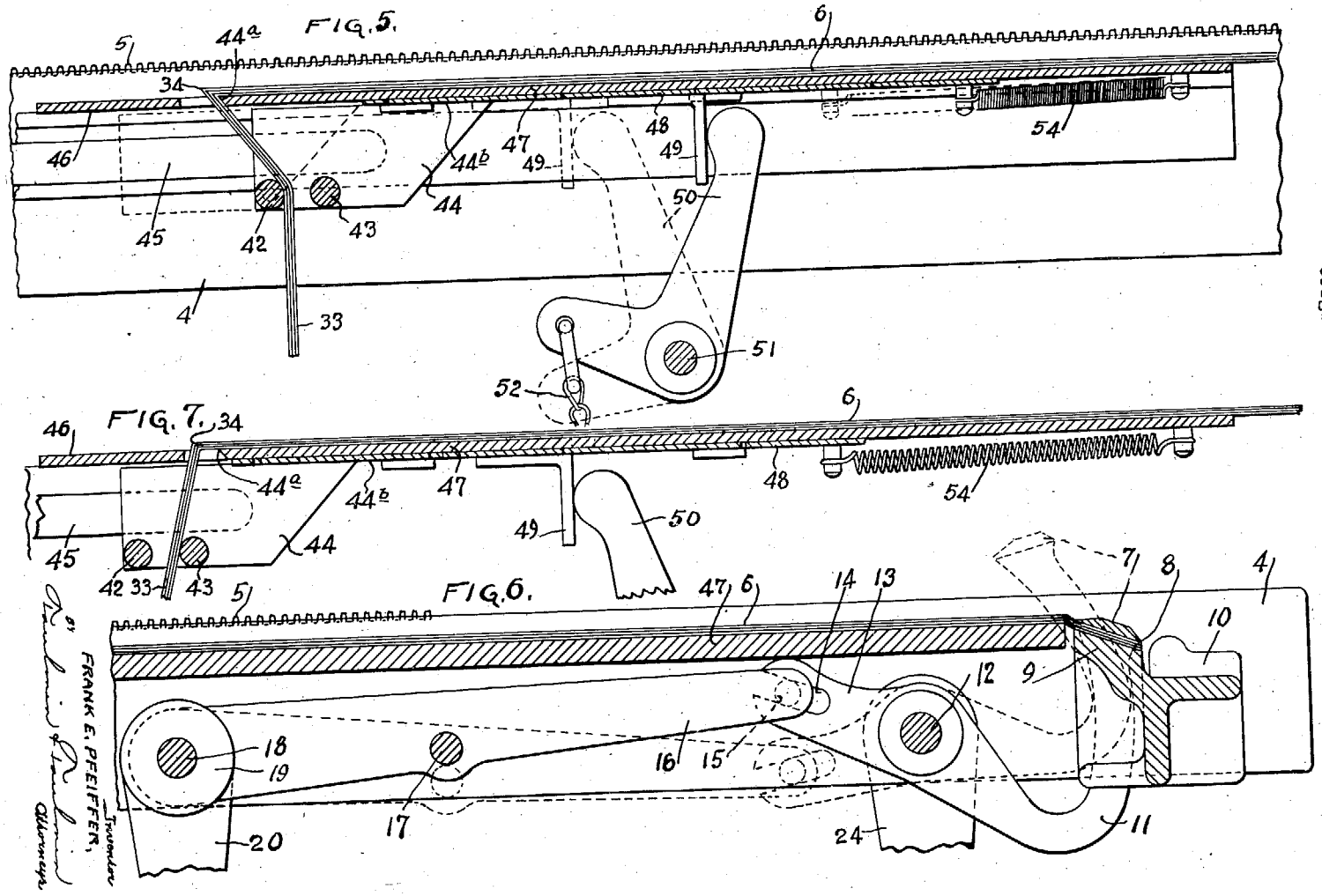
Inventor
FRANK E. PFEIFFER,
By Fauchin & Fauchin
Attorneys Reissued Mar. 16, 1937 Re. 20,296

UNITED STATES PATENT OFFICE 20,296

BILLING MACHINE

Frank E. Pfeiffer, Dayton, Ohio, assignor to The Egry Register Company, Dayton, Ohio, a corporation of Ohio Original No. 1,966,682, dated July 17, 1934, Serial No. 543,773, June 12, 1931. Application for reissue September 20, 1934, Serial No. 744,831

36 Claims. (Cl. 197—133)

My invention relates to sheet handling mechanism and particularly to mechanism for aligning a plurality of sheets arranged in superimposed relationship for registration writing and particularly to align those sheets in independent groups.

It is my object to align the independent groups by utilizing the transverse perforations or creases in the groups of sheets where those creases are superimposed over each other in the respective groups.

It is a further object of supplying from either a single source of supply or a plurality of sources of supply the plurality of groups of sheets to be aligned, of delivering them in a single group and, while so delivered in a single group, aligning each group independently to bring all members of the single group into alignment.

It is my object to provide further means for a common support for the aligned group and a common clamping means for the aligned group when so aligned.

It is a further object of my invention to release the common clamping means on the final single group and simultaneously actuate the means for aligning the independent groups so that the sheets comprising the single group may move independently in groups with respect to each other for final alignment.

Referring to the drawings:

Figure 5 is an enlarged detail section on the line 5—5 of Figure 1 showing the aligning mechanism of one of the groups;

Figure 6 is an enlarged detail section on the line 6—6 of Figure 1 showing the clamping mechanism for the composite group; in this view only one group of sheets is shown for the purpose of clarity, but, normally, there would be two or more groups of sheets which are clamped on the final writing table or platen;

Figure 7 is a detail view similar to Figure 5 showing the parts in aligned position for the sheets.

Figure 1:
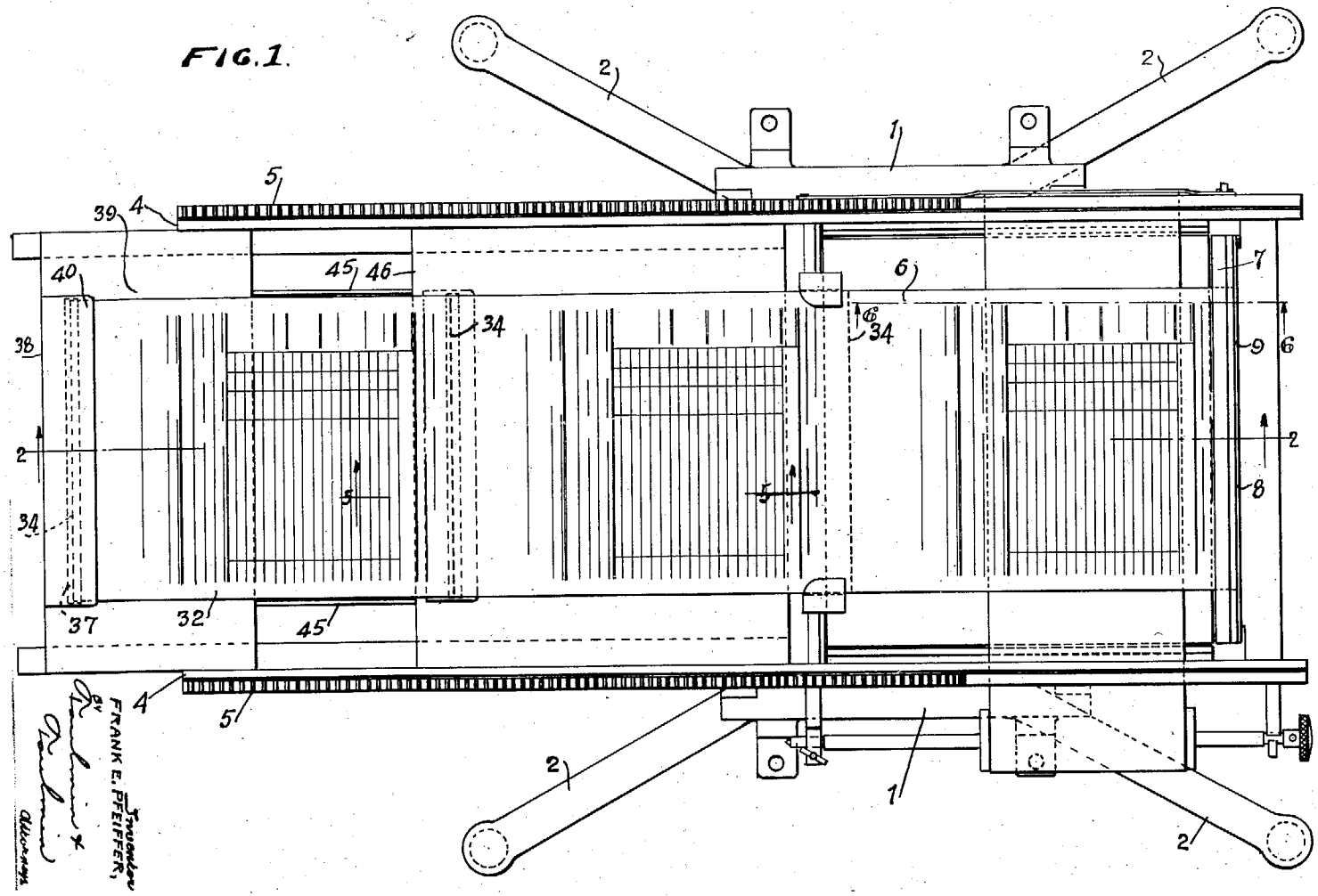
Figure 1 is a top plan view of a flat bed writing machine adaptable either for autographic writing or machine writing as by a flat bed platen typewriter or billing machine.
Figure 2:
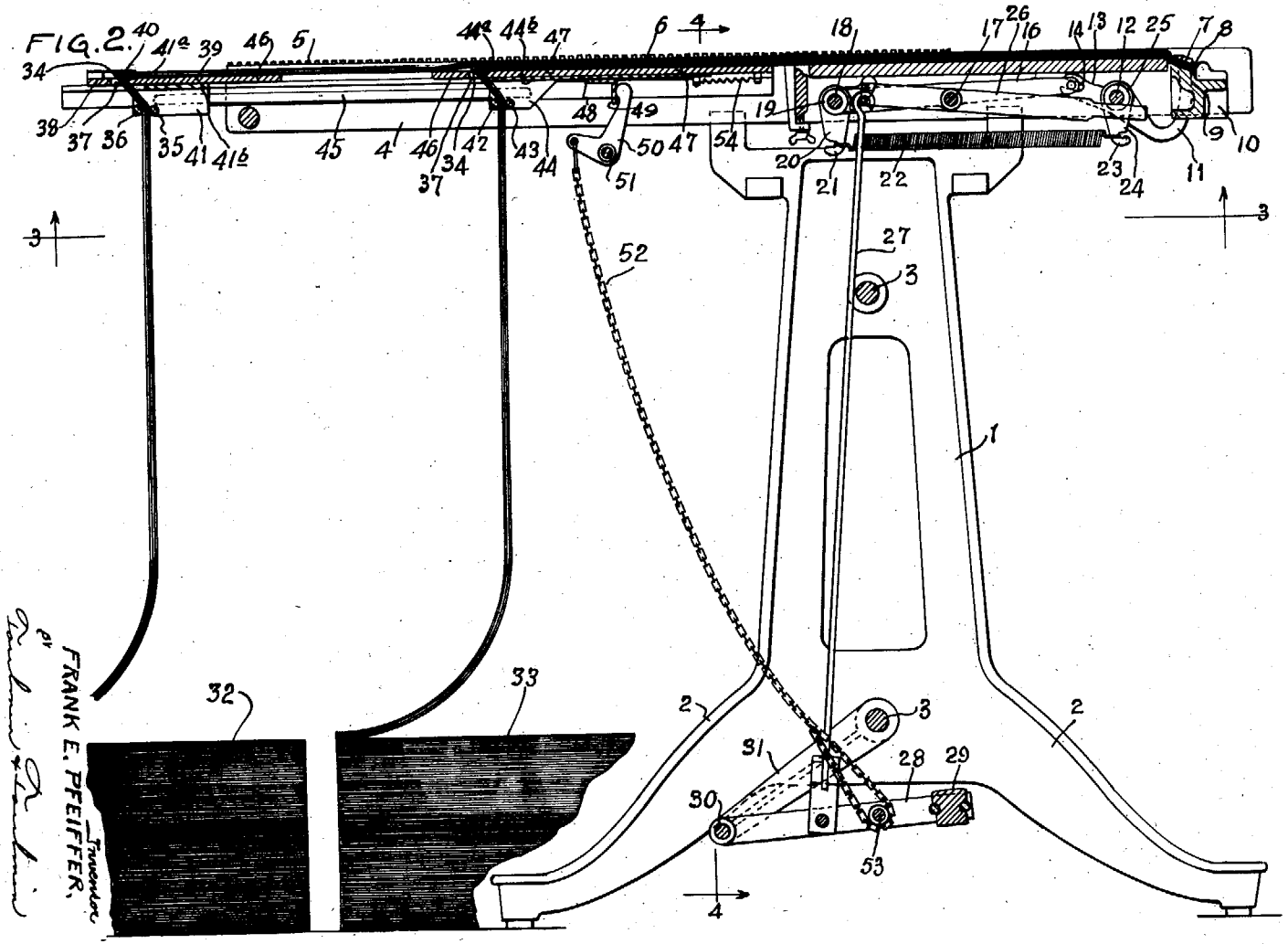
Figure 2 is a section on the line 2—2 of Figure 1 looking in the direction of the arrows.
Figure 3:
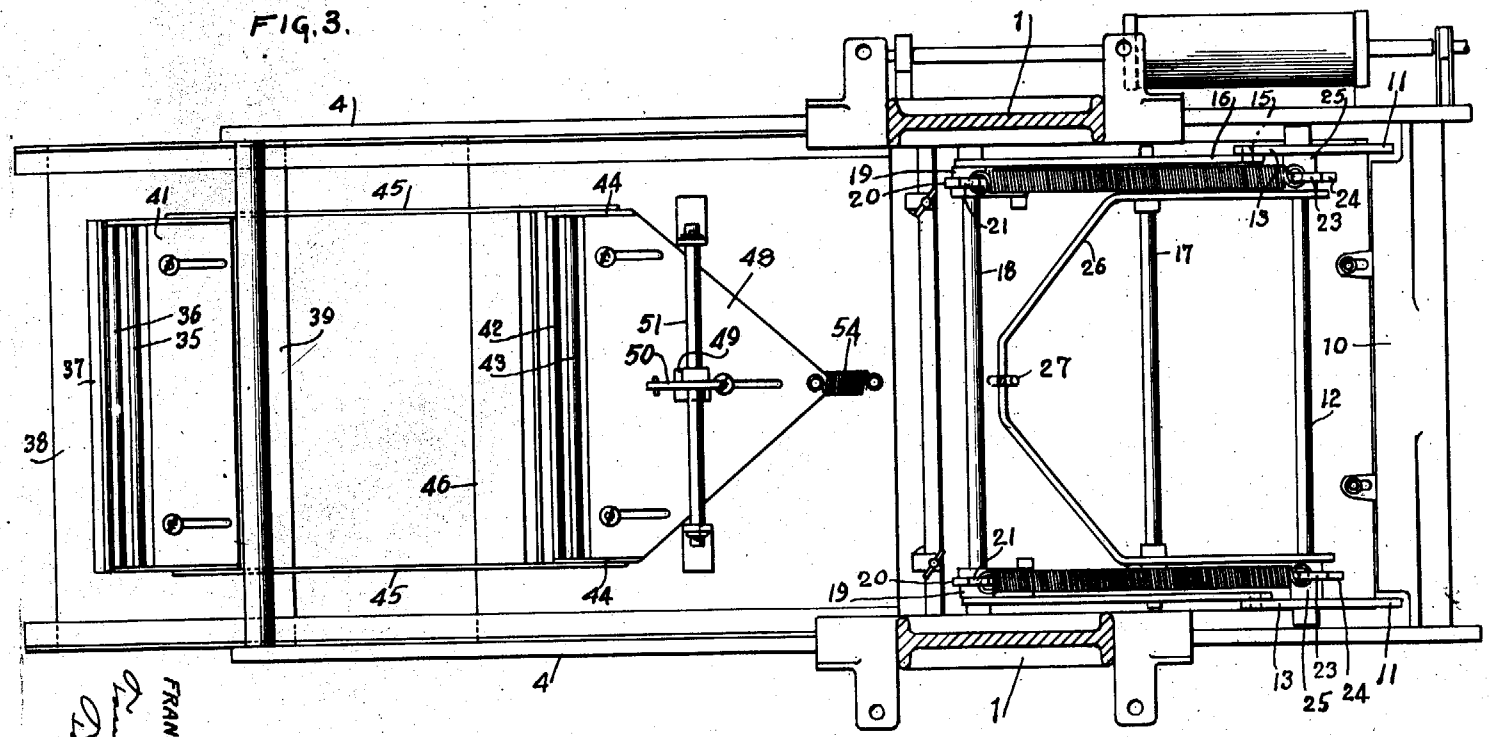
Figure 3 is a section on the line 3—3 of Figure 2 looking in the direction of the arrows.
Figure 4:
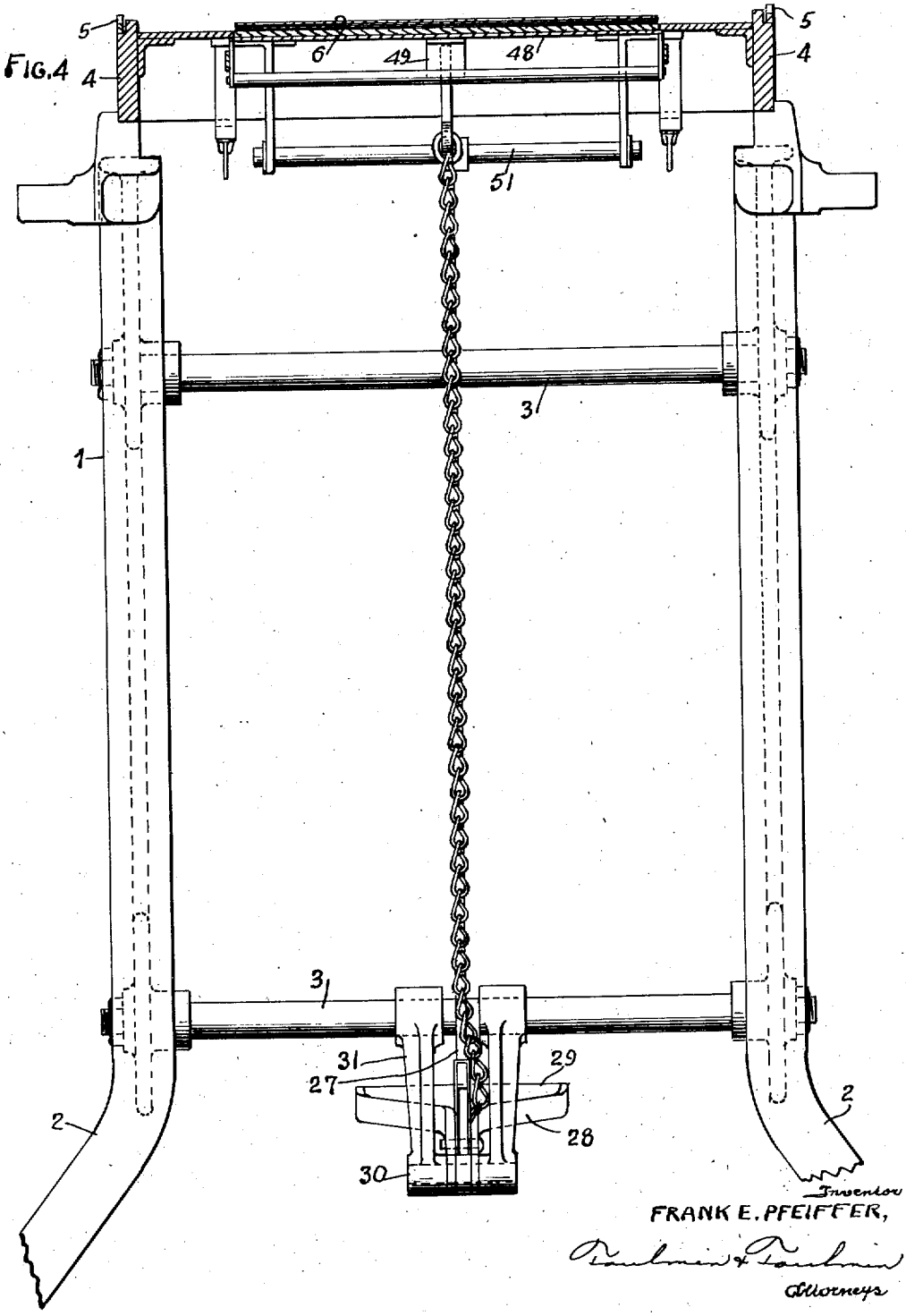
Figure 4 is a section on the line 4—4 of Figure 2.

Referring to the drawings in detail, a support comprising standards 1 and feet 2 arranged in spaced relationship and connected by the rods 3 forms a support for the mechanism hereinafter described, particularly the side bars 4. Mounted on the side bars 4 is the usual flat bed typewriter or billing machine which is connected to the racks 5. This has been omitted from the present showing as it forms no part of the present invention and is of conventional character.

My invention, of course, is adaptable to autographic or handwriting as well.

The operator normally sits or stands at the right hand end of the machine so as to be in position to operate the typewriter, billing machine or to write upon the superimposed group of sheets, designated 6. The sheets are pulled out by the operator towards the operator and the free ends of the sheets of group 6 are clamped by the clamp 7, which is provided with a sharp edge 8 against which the torn off sheets can be torn. The clamp 7 clamps the free ends of the sheets between the bottom of the clamp 7 and the clamping support 9 carried on the cross frame member 10 between the side bars 4.

The clamp 7 is carried by a pair of arcuate arms 11 pivoted on the cross shaft 12. The arm 11 is provided with an extension 13 having a slot 14 for receiving the pin 15 on one end of a lever 16 that is pivoted on a cross rod 17 between the bars 4. The other end of this lever 16 is pivotally mounted on the transverse rod 18 between the side bars 4 and is connected through the sleeve 19 with the depending finger 20 that constitutes a hook 21 for engagement with a spring 22. The other end of this spring is connected on a hook 23 on an arm 24 which is connected to a sleeve 25 that is a part of the lever 11. Thus, the spring, when actuated, is pulled from both ends when the levers 11 and 13 on the one hand and the lever 16 on the other hand assume a straight line position and approach dead center, which is the non-clamping position of the clamp 7.

This actuation of the lever 16 is effected through the rod 17 by the movement of the lever 26 which is mounted thereon and the free end of which is connected to the link 27. The link 27 is connected at its lower end to the foot treadle 28 having a foot bar 29. The rear end of this treadle is pivoted at 30 to the link 31 that is mounted upon the cross rod 3.

The sheets are fed from a pack in two groups generally designated 32 and 33. The group 32 consisting of a plurality of sheets with transverse creases or perforations 34, is fed upwardly between the guiding bars 35 and 36, through the slot 37 between the rear aligning table portions 38 and 39 and thence forwardly over the table 39. The portions of the sheet passing over the table 39 are guided and directed by a spring plate 40 mounted on the portion 38. The two bars 35 and 36 are carried between laterally disposed angular slide members 41 and reciprocate in synchronism with similar guide bars 42 and 43 carried on the slide 44 which guide the group of sheets 33. These reciprocating guide members 41 and 44 are connected by rods 45. The first mentioned group of sheets 32 proceed to the right hand towards the operator over the aligning table portion 46 and thence over the top of the group of sheets 33 serving thereby as the aligning and directing means for the group of sheets 33 in the same manner that the spring plate 40 serves as a directing means for the group of sheets 32 to direct them into a horizontal plane. Both groups of sheets proceed thereafter over the aligning table 47 as a composite unit designated group 6, the free ends of each group of sheets being clamped by the clamp 7 as heretofore explained.

It will be noted that the two slides 41 and 44 with their connecting rods 45 are actuated by a common actuating plate 48 having an annular cross member 49 which is engaged by the bell crank 50 pivoted at 51 and actuated by a chain 52 that is connected around the rod 53 on the foot treadle 28 so that, when the treadle is actuated by pressing downwardly by the operator, the clamp 7 will be elevated while the sheets are thus loosened from the clamp and can slide horizontally one on the other. The sheets are aligned by groups by the movement of the slides 41 and 44.

The slides 41 and 44 have thereon transverse plates 41*b* and 44*b*. The rear ends of the plates 46 and 47 have formed thereon sharp edges 41*a* and 44*a* for engagement with transverse creases in the strips of paper for aligning the strips when the transverse plates 41*b* and 44*b* are moved forwardly under the action of the spring 54.

In Figure 5 the transverse rods 42 and 43 are in the advanced position for holding the sheets 33 so that they are aligned by means of the sharp edge 44*a*. In Figure 7 these same rods 42 and 43 are in their rearward positions for permitting the feeding of the strips through the slot in the tables or plates. The rods 35 and 36 and the rods 42 and 43 engage the respective groups of sheets 32 and 33 pushing them backwardly to loosen them so that they can be thus aligned. Such movement unbends the sheets as shown in Figure 5 from engagement with the sharp corners of the plate 47 and the plate 39 respectively. When the treadle is released the spring 54 moves these aligning plates forwardly, and, in doing so, causes the rods 36 and 42 to engage the respective groups of sheets 32 and 33 and to cause them to engage the sharp edges of the plates 39 and 47 and to thus place an acute angle in the sheets along the lines of their perforations. This prevents forward movement of the sheets and the entire group of sheets 6 is clamped by the clamp 7.

There are several advantages gained by the alignment of the sheets in groups and the delivery of the aligned groups in a single group and the alignment of the sheets while in the single group after each writing operation when the sheets written upon have been torn off. When utilizing a machine having more than three or four sheets, if an alignment is attempted by aligning on the creases as indicated, it has been found that, due to the excessive number of sheets over three or four, or if particularly heavy paper is being employed, the sheets in doing their aligning operation will pull themselves out of alignment due to the thickness of the group of sheets over the aligning creases or transverse perforations. By aligning in groups, this mal-alignment does not take place because there are insufficient number of sheets to cause sufficient thickness to throw the sheets out of alignment. Therefore, perfect alignment is secured and, at the same time, the advantage of having from three to fifteen, or twenty, sheets in superimposed relationship in a single group maintained in perfect alignment is obtained.

The alignment is retained by moving the bars 42 and 43, or 36 and 35 into their forward locking positions to hold the aligned creased sheets against the sharp edges of the supporting plates 39 and 47.

Another advantage that results from this arrangement is that the sheets may be separately written upon in aligned groups on the respective supports 39 and 47 or on the support 39 and the support 55, which supports the group of sheets 6.

A further advantage is the fact that, with a plurality of these groups of sheets and separate aligning means for each group, the machine is rendered flexible so that any number of groups may be written upon by laying back the sheets of one group and not utilizing them while the other group is being written upon.

It will be understood that a plurality of carbon sheets are interleaved between the composite group of sheets 6 but the showing of these carbon sheets is eliminated for the purpose of clarity, as such arrangement is a conventional one in mechanism of this character.

It will be understood that I desire to comprehend within my invention such modifications as may be necessary to adapt it to varying conditions and uses.

Having thus fully described my invention, what I claim as new and desire to secure by Letters Patent, is:

1. In a machine for writing upon a plurality of superimposed sheets having transverse creases, means for aligning said sheets by groups of said sheets by aligning said sheets on their transverse creases, and means for supporting said sheets in a single group of aligned sheets.

2. In a machine for writing upon a plurality of superimposed sheets having transverse creases, means for aligning said sheets by groups of said sheets by aligning said sheets on their transverse creases, and means for supporting said sheets in a single aligned group, and means of clamping the group.

3. In a machine for writing upon a plurality of superimposed sheets having transverse creases, means for aligning said sheets by groups of said sheets by aligning said sheets on their transverse creases, means for supporting said sheets in a single aligned group, means of clamping the group, and means for unclamping the group just before the alignment of the separate groups takes place.

4. In a machine for writing upon a plurality of superimposed sheets having transverse creases, means for aligning said sheets by groups of said sheets by aligning said sheets on their transverse creases, means for supporting said sheets in a single aligned group, means of clamping the group, means for unclamping the group just before the alignment of the separate groups takes place, and means to effect the alignment of the separate groups simultaneously.

5. In combination in a machine for writing upon a plurality of registered superimposed sheets having transverse creases, a slotted plate, an aligning slide adapted to move with relation to the slot in said plate, front and rear guide bars in spaced relationship mounted on said slide between which said superimposed sheets are guided through the slot and over a portion of the slotted plate at substantially right angles to the plane of delivery of the sheets, whereby said guide bars engaging the sheets adjacent the slot will draw said sheets forward for alignment along the transverse creases therein.

6. In combination in a machine for writing upon a plurality of registered superimposed sheets having transverse creases, a slotted plate, an aligning slide adapted to move with relation to the slot in said plate, front and rear guide bars in spaced relationship mounted on said slide between which said superimposed sheets are guided through the slot and over a portion of the slotted plate at substantially right angles to the plane of delivery of the sheets, whereby said guide bars engaging the sheets adjacent the slot will draw said sheets forward for alignment along the transverse creases therein, means for actuating said slide, and a clamping means for engaging the free ends of said sheets adapted to be unclamped when said slide is actuated.

7. In combination in a machine handling a plurality of superimposed sheets having transverse aligning creases, a plate over which said sheets are drawn having an edge for aligning the transverse creases of the sheets, a slide adapted to engage said sheets adjacent the bottom of said plate, spaced bars on said slide for alternately pushing and pulling said sheets away from and against the edge of said plate, a second mechanism of similar character interconnected with the first mentioned mechanism, whereby said slides move simultaneously and the sheets handled thereby are aligned simultaneously in independent groups, and a common means for supporting and clamping the groups of sheets in a single group.

8. In combination in a machine handling a plurality of superimposed sheets having transverse aligning creases, a plate over which said sheets are drawn having an edge for aligning the transverse creases of the sheets, a slide adapted to engage said sheets adjacent the bottom of said plate, spaced bars on said slide for alternately pushing and pulling said sheets away from and against the edge of said plate, a second mechanism of similar character interconnected with the first mentioned mechanism, whereby said slides move simultaneously and the sheets handled thereby are aligned simultaneously in independent groups, a common means for supporting and clamping the groups of sheets in a single group, and means for unclamping said sheets just before they are aligned in groups.

9. In combination in a machine handling a plurality of superimposed sheets having transverse aligning creases, a plate over which said sheets are drawn having an edge for aligning the transverse creases of the sheets, a slide adapted to engage said sheets adjacent the bottom of said plate, spaced bars on said slide for alternately pushing and pulling said sheets away from and against the edge of said plate, a second mechanism of similar character interconnected with the first mentioned mechanism, whereby said slides move simultaneously and the sheets handled thereby are aligned simultaneously in independent groups, a common means for supporting and clamping the groups of sheets in a single group. and means for unclamping said sheets just before they are aligned in groups, means associated with the first mechanism for aligning the first group of sheets to direct the sheets in parallel relationship over the supporting plate, said second group of sheets being engaged by the first group of sheets for directing the second group of sheets over the second supporting plate.

10. In combination in a machine having a plurality of superimposed sheets having transverse creases, means of supplying said sheets in groups to spaced tables at substantially right angles thereto and of directing each group of sheets over said tables at right angles to the plane of delivery of the sheets and parallel to the surface of the tables, means for aligning the sheets of each group against the edges of the tables along the line of the creases in the sheets, means of supporting the groups of sheets in a single group, means of clamping the single group of sheets, means of unclamping the single group of sheets and effecting a subsequent alignment in the separate groups of sheets.

11. In combination in a machine having a plurality of superimposed sheets having transverse creases, means of supplying said sheets in groups to spaced tables at substantially right angles thereto and of directing each group of sheets over said tables at right angles to the plane of delivery of the sheets and parallel to the surface of the tables, means for aligning the sheets of each group against the edges of the tables along the line of the creases in the sheets, means of supporting the groups of sheets in a single group, means of clamping the single group of sheets, means of unclamping the single group of sheets and effecting a subsequent alignment in the separate groups of sheets, and independent yielding means for resisting the unclamping movement of the aligning mechanism.

12. In a machine having a plurality of sheets in superimposed substantial aligned relationship and having transverse creases in substantially superimposed relationship, means for aligning said sheets in groups along their transverse creases means for delivering the sheets into a single group, means for clamping said sheets in the single group, and a common means for releasing the sheet clamping means and the aligning means substantially simultaneously.

13. In a machine having a plurality of sheets in superimposed substantial aligned relationship and having transverse creases in substantially superimposed relationship, a supporting standard, a foot treadle mounted thereon, a supporting plate for a plurality of sheets, a clamp adapted to engage said sheets, yielding means for maintaining said clamp in position, means for connecting said clamp to the foot treadle, means for supporting and delivering a plurality of sheets in a plane at right angles to the plane of the support for the sheets, means for aligning said sheets along their transverse creases and for delivering them in a horizontal plane on to the supporting table, and means interconnecting the aligning means and said foot treadle for simultaneous operation with the clamp.

14. In a machine having a plurality of sheets in superimposed substantial aligning relationship and having transverse creases in substantially superimposed relationship, a supporting standard, a foot treadle mounted thereon, a supporting plate for a plurality of sheets, a clamp adapted to engage said sheets, yielding means for maintaining said clamp in position, means for connecting said clamp to the foot treadle, means for supporting and delivering a plurality of sheets in a plane at right angles to the plane of the support for the sheets, means for aligning said sheets along their transverse creases and for delivering them in a horizontal plane on to the supporting table, and means interconnecting the aligning means and said foot treadle for simultaneous operation with the clamp, and yielding means for restoring the aligning means and clamp to their initial position and of returning the foot treadle to its initial position.

15. In combination, a plurality of horizontally-disposed spaced slotted tables adapted to support sheets having transverse creases, slidable means on each table carrying spaced guide members, said guide members being adapted to align the sheets on their transverse creases and guide the sheets in groups therebetween and through the slots of said tables; and another table for supporting all of said sheets in loose, superimposed relationship to permit independent movement of the sheets.

16. In combination in a machine having a plurality of superimposed sheets having transverse creases, a writing table for supporting a plurality of groups of sheets, a plurality of spaced separate aligning tables, each adapted to receive a group of sheets, means associated with each aligning table for aligning the group of sheets against the edges of the aligning tables along the lines of creases of the sheets, and means of clamping the sheets of all the groups after alignment on the writing table in a single group of aligned sheets.

17. In a billing machine, a table having slots therein, each slot adapted to receive a group of sheets of paper, means adjacent each slot to align the sheets therein, means on the table to clamp the sheets of both groups, and a common means to release the clamp and operate the aligning means.

18. In a billing machine, a table having slots therein, each slot being adapted to receive a group of sheets of paper, means beneath each slot to move the sheets of paper therein with relation to the slot, a clamp on the table to clamp all the sheets, and a common means to release the clamp and to operate said means.

19. In a billing machine, a table having slots therein to receive sheets of paper, the table on one side of each slot having a sharp edge, means beneath each slot tending to hold the sheets therein against the sharp edge, a clamp for clamping all of the sheets, and a common means to release the clamp and to move said means to move the sheets away from the sharp edges.

20. In a billing machine, a table having a plurality of slots therein to receive sheets of paper, the table on one side of each slot having a sharp edge, means beneath each slot tending to hold the sheets therein against the sharp edge, a clamp on the table for clamping all of the sheets, and a treadle for releasing the clamp and to move said means to move the sheets away from the sharp edges.

21. In a billing machine, a table having a plurality of slots therein to receive sheets of paper, the table on one side of each slot having a sharp edge, a pair of rollers beneath each slot tending to hold the sheets therein against the sharp edge, a clamp for clamping all of the sheets, and a common means for releasing the clamp and for moving the rollers to move the sheets away from the sharp edges.

22. In a billing machine, a table having a plurality of slots therein to receive sheets of paper, the table on one side of each slot having a sharp edge, a pair of rollers beneath each slot tending to hold the sheets therein against the sharp edge, a clamp for clamping all of the sheets, and a treadle for releasing the clamp and to move the rollers to move the sheets away from the sharp edges.

23. In a machine having a plurality of sheets, means to supply said sheets to said machine in separate groups, separate means for aligning said sheets in each group, and means for supporting said groups as a single group both before and after the operation of said aligning means.

24. In a machine having a plurality of sheets, means to supply said sheets to said machine in separate groups, separate means for aligning said sheets in each group, means for supporting said groups as a single group both before and after the operation of said aligning means, and means for intermittently clamping the single group of sheets.

25. In a machine having a plurality of sheets, means to supply said sheets to said machine in separate groups, separate means for aligning said sheets in each group, means for supporting said groups as a single group both before and after the operation of said aligning means, means for intermittently clamping the single group of sheets, and means for unclamping the single group of sheets while the sheets are being aligned.

26. Apparatus of the character described having, in combination, means for guiding a strip to writing position including a transverse strip checking edge, and a strip-retracting device movable into and out of position projecting outside said checking edge.

27. Apparatus of the character described having in combination, a strip-aligner around which the strips are adapted to fold, and a device movably mounted adjacent to said strip aligner and operable to cause unfolding action of the strips at said aligner.

28. In an autographic machine, a writing table, means of supplying transversely creased stationery arranged in a superimposed series of sheets, the creases of which are adapted to be aligned on the rear edge of the writing table, and reciprocable means beneath the writing table adapted to engage said sheets adjacent their engagement on their creases with the rear edge of the writing table to change the angularity of that portion of the sheets beneath the table to facilitate the movement of the sheets over the table.

29. In an autographic machine, a writing table, means of supplying transversely creased stationery arranged in a superimposed series of sheets, the creases of which are adapted to be aligned on the rear edge of the writing table, reciprocable means beneath the writing table adapted to engage said sheets adjacent their engagement on their creases with the rear edge of the writing table to change the angularity of that portion of the sheets beneath the table to facilitate the movement of the sheets over the table, and clamping means for the forward ends of the sheets on the table to maintain said sheets originally on the table.

30. In an autographic machine, a writing table, means of supplying transversely creased stationery arranged in a superimposed series of sheets, the creases of which are adapted to be aligned on the rear edge of the writing table, reciprocable means beneath the writing table adapted to engage said sheets adjacent their engagement on their creases with the rear edge of the writing table to change the angularity of that portion of the sheets beneath the table to facilitate the movement of the sheets over the table, clamping means for the forward ends of the sheets on the table to maintain said sheets originally on the table, and a common actuating means for releasing the clamping of the forward ends of the sheets and for releasing the rear ends of the sheets by changing the angle of the ends of the sheets beneath the table adjacent the rear edge thereof.

31. In an autographic machine, a writing table, means of supplying transversely creased stationery arranged in a superimposed series of sheets, the creases of which are adapted to be aligned on the rear edge of the writing table, reciprocable means beneath the writing table adapted to engage said sheets adjacent their engagement on their creases with the rear edge of the writing table to change the angularity of that portion of the sheets beneath the table to facilitate the movement of the sheets over the table, clamping means for the forward ends of the sheets on the table to maintain said sheets originally on the table, a common actuating means for releasing the clamping of the forward ends of the sheets and for releasing the rear ends of the sheets by changing the angle of the ends of the sheets beneath the table adjacent the rear edge thereof, and a common yielding means for retracting said last mentioned means to draw the sheets beneath the writing table at the rear edge thereof to lock them on their creases on the rear edge of the writing table, and to clamp the sheets at their forward edges with respect to the writing table.

32. Apparatus of the character described having, in combination, means for guiding a strip to writing position, a transverse strip-checking edge, a gripper, and a strip-retracting device.

33. Apparatus of the character described having, in combination, means for guiding a strip to writing position, a transverse strip checking edge, a gripper, and a strip-retracting device movable into and out of position projecting outside said checking edge.

34. Apparatus of the character described, having, in combination, a platen, having an opening for passage of a record strip, a strip-guide adjacent said opening, a transverse strip-checking edge, and means for retracting the record strip, said strip-retracting means being movable into and out of position projecting outside said checking edge.

35. Apparatus of the character described having, in combination, a strip-aligner around which the strips are adapted to fold, a device to cause unfolding action of the strips at said aligner, and a movable tearing bar operatively connected to said unfolding device, whereby said unfolding device is actuated when said tearing bar is moved.

36. In an apparatus of the character described, in combination, a platen, a strip-checking member, a strip-releasing device movably mounted adjacent said strip checking device, a movable strip tearing bar positioned forwardly of the platen and operating connections for operating said strip-releasing device when said strip tearing bar is moved.

FRANK E. PFEIFFER.